(12) United States Patent
Moon

(10) Patent No.: US 11,735,378 B2
(45) Date of Patent: Aug. 22, 2023

(54) AUTOMATIC TRANSFER SWITCH WITH N-PHASE OVERLAPPING STRUCTURE

(71) Applicant: O-SUNG ELECTRIC MACHINERY CO., LTD., Paju-si (KR)

(72) Inventor: Sunghwan Moon, Seoul (KR)

( * ) Notice: Subject to any disclaimer, the term of this patent is extended or adjusted under 35 U.S.C. 154(b) by 0 days.

(21) Appl. No.: 17/852,400

(22) Filed: Jun. 29, 2022

(65) Prior Publication Data

US 2023/0215667 A1 Jul. 6, 2023

(30) Foreign Application Priority Data

Jan. 6, 2022 (KR) ........................ 10-2022-0002151

(51) Int. Cl.
| | |
|---|---|
| *H01H 9/26* | (2006.01) |
| *H02J 9/06* | (2006.01) |
| *H01H 9/00* | (2006.01) |

(52) U.S. Cl.
CPC ............ *H01H 9/26* (2013.01); *H01H 9/0072* (2013.01); *H02J 9/063* (2020.01)

(58) Field of Classification Search
CPC .. H01H 9/26; H01H 9/0072; H01H 2300/018; H01H 15/00; H01H 9/00; H02J 9/063
USPC ..... 200/50.32; 307/64, 104, 80, 126, 85, 86, 307/70, 65, 87
See application file for complete search history.

(56) References Cited

U.S. PATENT DOCUMENTS

2022/0239073 A1\* 7/2022 Moon ...................... H02B 1/14

FOREIGN PATENT DOCUMENTS

| KR | 20100020182 | \* | 2/2010 | ............... H01H 9/20 |
| KR | 10-0984031 B1 | | 9/2010 | |

\* cited by examiner

*Primary Examiner* — Edwin A. Leon
*Assistant Examiner* — Iman Malakooti

(57) ABSTRACT

Proposed is an automatic transfer switch with an N-phase overlapping structure, the switch including: a driving unit including a drive shaft provided to generate power; a three-contact switching unit including a normal power shaft and an emergency power shaft provided to be rotated by the drive shaft, and a normal power terminal and an emergency power terminal for inputting/releasing normal power and emergency power; and an N-phase overlapping unit including a first insertion part having a first insertion hole, an N-phase normal contact terminal provided to input/release an N-phase normal power, a second insertion part having a second insertion hole, an N-phase emergency contact terminal provided to input/release an N-phase emergency power, and a connection bar connected between the first insertion part and the second insertion part so as to be interlocked with each other.

8 Claims, 11 Drawing Sheets

AUTOMATIC TRANSFER SWITCH WITH N-PHASE OVERLAPPING STRUCTURE

CROSS REFERENCE TO RELATED APPLICATION

The present application claims priority to Korean Patent Application No. 10-2022-0002151, filed Jan. 6, 2022, the entire contents of which is incorporated herein for all purposes by this reference.

BACKGROUND OF THE INVENTION

Field of the Invention

The present disclosure relates to an automatic transfer switch with an N-phase overlapping structure and, more particularly, to an automatic transfer switch with an N-phase overlapping structure, which allows a normal power supply and an emergency power supply to be switched after overlapping in N phase (neutral contact) in order to ensure stable operation of various equipment on a load side.

Description of the Related Art

An automatic transfer switch (ATS), also called an emergency power transfer switch, is a device that automatically switches (transfers) to emergency power when normal power supplies fail due to a power outage or undervoltage in a system consisting of emergency power (generator or Korea Electric Power Corporation (KEPCO) reserve line power, etc.) other than normal power supplied by KEPCO. Large-scale business sites such as hospitals, factories, research centers, and broadcasting stations, and businesses that may have problems if the power supply is cut off have a generator to generate emergency power. In these sites, automatic transfer switches are installed and used to supply emergency power (reserve power) generated from the generator to a normal power supply when a problem occurs due to power supply interruption.

As shown in FIG. 1, the automatic transfer switch supplies power from a normal power supply 11 to a load 19 by connecting the normal power supply 11 and the load 19 in normal times, whereas when an abnormality occurs in the normal power supply 11, the switch supplies power from the emergency power supply 12 to the load 19 by connecting the emergency power supply 12 and the load 19. The automatic transfer switch 13 includes: a first fixed terminal 13-1 connected to the normal power supply 11 that normally supplies electric power 13-1; a second fixed terminal 13-2 connected to the emergency power supply 12; a third fixed terminal 13-3 connected to the load 19; and a movable terminal 13-4 for supplying power to the load 19 side from any one of the normal power supply 11 and the emergency power supply 12 by connecting the first fixed terminal or the second fixed terminal and the third fixed terminal.

To describe the operation of the automatic transfer switch, a transfer occurs in such a way that in normal times, the automatic transfer switch 13 is connected to the normal power supply 11 and supplies power to the load 19 side whereas when an abnormality of the normal power supply 11 is detected, the automatic transfer switch 13 cuts off the connection between the normal power supply 11 and the load 19 and connects the emergency power supply 12 and the load 19 so that power is supplied from the emergency power supply 12 to the load 19 side. Meanwhile, during the above-described transferring process, an arc is generated between the contact points of the fixed terminals 13-1 and 13-2 and the movable terminal 13-4 to sustain current between the contact terminals.

The arc disappears and is extinguished after current zero crossing. The arcing (arc-extinguishing) time is approximately 10-12 ms, and various equipment on the load 19 side may be protected only when a neutral contact (N phase) is opened 10-12 ms after the other 3 contacts (R, S, T phases). However, the conventional automatic transfer switch described above may be insufficient to protect the equipment on the load side because an opening time gap between the neutral contact (N phase) and the other 3 contacts (R, S, T phases) is less than 10 ms. In particular, in the automatic transfer switch applied to the power generation equipment of important facilities such as broadcasting stations and telegraph offices, military communication and radar facilities, banks and computer facilities, various electric furnaces, petrochemical plants, etc., if a physical time difference occurs in the process of switching the neutral contacts between normal power and emergency power, it may cause a problem that a potential difference may occur instantaneously, even for a short time. Here, at the time of switching, when the phase of the voltage energized to the load 19 and the phase of the voltage at the emergency power supply 12 side when connected to the emergency power supply 12 are different from each other, unexpected high voltages may occur and damage electronic equipment. In addition, non-linear load increases the earth potential, creating potential difference between earth and neutral lines. Thus, during transfer using the conventional ATS, neutral line is separated from the load side and the reference potential is not established, which leads to a floating phenomenon and may cause malfunction of electronic equipment.

DOCUMENTS OF RELATED ART (Patent Document 0001) Korean Patent No. 10-0984031

SUMMARY OF THE INVENTION

Accordingly, the present disclosure has been made keeping in mind the above problems occurring in the related art, and the present disclosure is intended to provide an automatic transfer switch with an N-phase overlapping structure, which is designed to prevent malfunction or damage of electronic equipment on a load side due to a phase difference between the load side voltage and the emergency power side voltage by making a normal power supply and an emergency power supply overlap in a neutral contact (N phase) and then switch in the process of switching between the normal and emergency power supplies in three contacts (R, S, T phases).

In order to achieve the above objective, according to an embodiment of the present disclosure, there is provided an automatic transfer switch with an N-phase overlapping structure, including: a driving unit including a drive shaft provided to generate power; a three-contact switching unit including a normal power shaft and an emergency power shaft provided to be rotated by the drive shaft, and a normal power terminal and an emergency power terminal for inputting/releasing normal power and emergency power by rotation of the normal power shaft and the emergency power shaft; and an N-phase overlapping unit including a first insertion part having a first insertion hole into which the normal power shaft is inserted, an N-phase normal contact terminal provided to input/release an N-phase normal power by rotation of the first insertion part, a second insertion part having a second insertion hole into which the emergency power shaft is inserted, an N-phase emergency contact terminal provided to input/release an N-phase emergency power by rotation of the second insertion part, and a connection bar connected between the first insertion part and the second insertion part so as to be interlocked with each other by rotation of the first insertion part and the second insertion part, wherein the first insertion part of the N-phase overlapping unit may be provided to be interlocked with the rotation of the normal power shaft, and the second insertion part may be provided so as to be rotated independently of the emergency power shaft.

At this time, a cross section of the second insertion hole of the second insertion part may be polygon, and a cross section of the emergency power shaft may be circular.

In addition, the drive shaft may be provided to be able to lift from one side to the other side of the driving unit, and each of the normal power shaft and the emergency power shaft may include linkers each having a long hole through which the drive shaft is hooked and coupled.

At this time, a lifting groove may be formed in the driving unit to provide a lifting path of the drive shaft in a "V" shape, and the linkers may be overlapped with each other in a "V" shape corresponding to the lifting groove.

At this time, a "V" angle between the first side and the second side of the lifting groove may be smaller than a "V" angle of the linkers overlapping each other in the "V" shape.

As described above, the automatic transfer switch with an N-phase overlapping structure according to the present disclosure has an effect that no potential difference is created in the process of switching between three-contact normal and emergency power supplies since the normal and emergency power supplies overlap in a neutral contact (N phase) before switching occurs. That is, the present disclosure has an effect that no phase difference between the load side voltage and the emergency power side voltage is created in the process of switching between normal and emergency power supplies because there is no physical time difference in the switching time between normal power and emergency power in the neutral contact. Accordingly, the present disclosure can prevent damage to load-side electronic equipment caused by high voltages, and enables stable operation of electronic equipment since problems such as malfunction of electronic equipment are avoided.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The terms or words used in the present specification and claims are not to be construed as limited in their ordinary or dictionary meanings, but should be interpreted as meanings and concepts consistent with the technical spirit of the present disclosure based on the principle that the inventor can appropriately define the concept of a term to describe his/her invention in the best way.

Hereinafter, an automatic transfer switch with an N-phase overlapping structure (hereinafter referred to as an "automatic transfer switch") according to a preferred embodiment of the present disclosure will be described with reference to FIGS. 2 to 5C.

The automatic transfer switch makes it possible that no physical time difference occurs during transfer of power from a normal supply to an emergency supply by allowing a normal power terminal and an emergency power terminal to be switched after overlapping in a neutral contact (N phase) in the process of switching between normal power supply and emergency power supply at a three-contact (R, S, T phases) switching unit. Accordingly, the automatic transfer switch may prevent damage to electronic equipment and malfunction of electronic equipment due to unexpected high voltage generation, so that the operation of electronic equipment may be performed stably.

Figure 1:
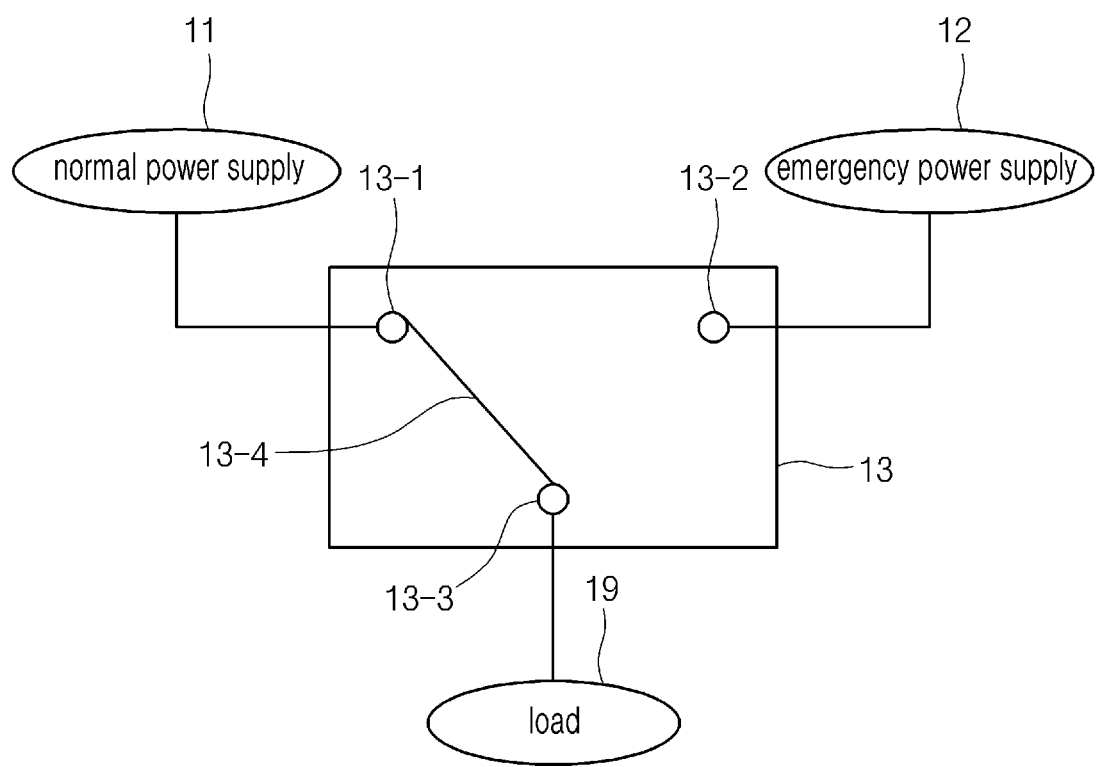
FIG. 1 is a diagram showing a circuit configuration of an automatic transfer switch according to the conventional art.
Figure 2:
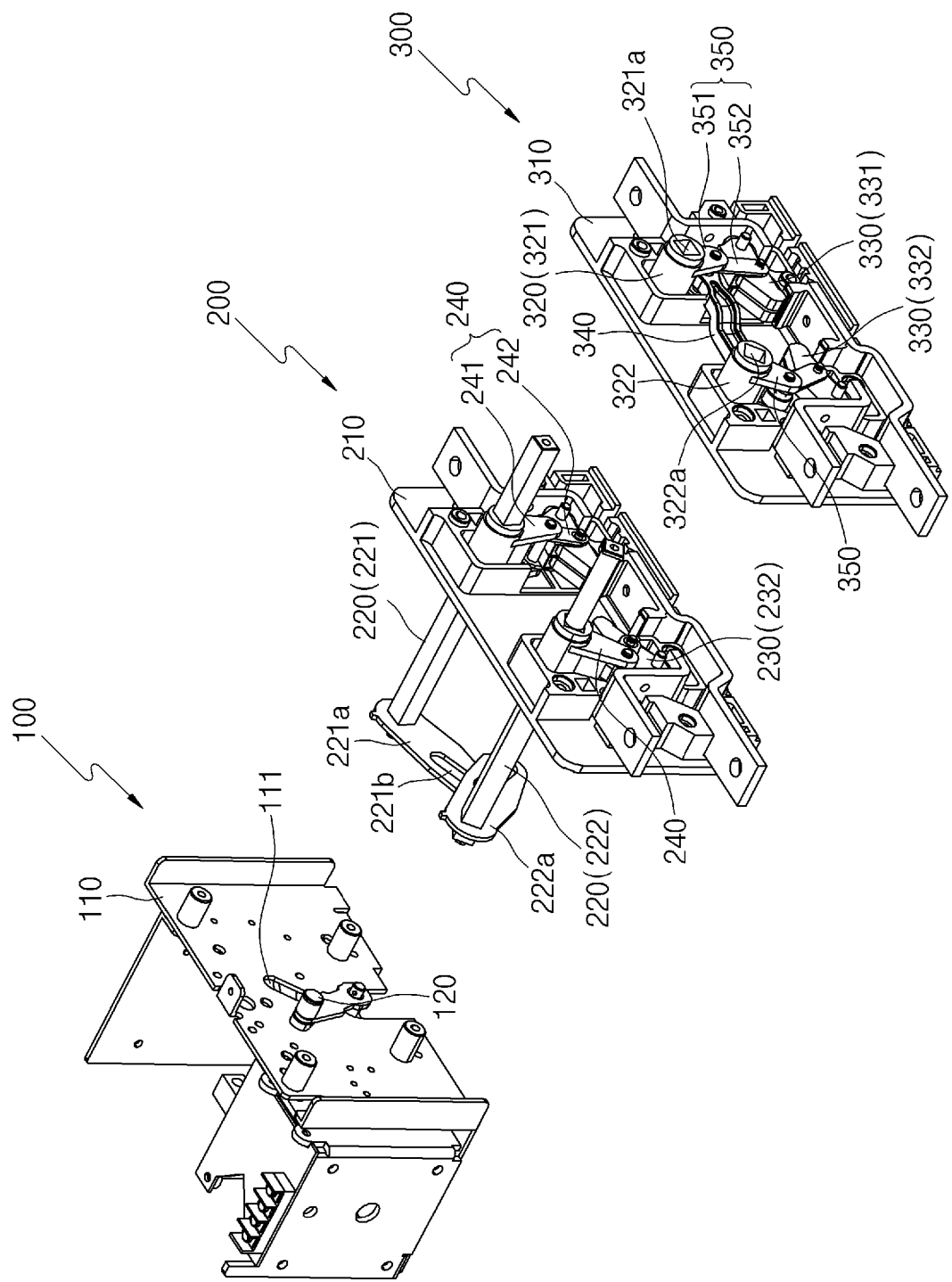
FIG. 2 is a view showing only the main parts by disassembling an automatic transfer switch with an N-phase overlapping structure according to a preferred embodiment of the present disclosure.

As shown in FIG. 2, the automatic transfer switch includes a driving unit 100, a three-contact switching unit 200, and an N-phase overlapping unit 300.

The driving unit 100 is configured to generate power for switching between normal power supply and emergency power supply. The driving unit 100 may automatically generate switching power through an electronic circuit configuration, and is provided so that switching power may be generated by manual operation of an operator. The driving unit 100, as shown in FIG. 2, includes a casing 110 and a drive shaft 120. A drive motor (not shown) is installed in the casing 110, and a lifting groove 111 providing a movement path of the drive shaft 120 is formed on the front surface of the casing 110 in the drawing. It is preferable that the lifting groove 111 is provided in a "V" shape so that the drive shaft 120 may descend from one side of the casing 110 and rise to the other side. The drive shaft 120 serves to rotate a shaft of the three-contact switching unit 200 to be described later by the power of the drive motor. That is, the drive shaft 120 is installed so as to be lifted from one side of the casing 110 to the other side along the lifting groove 111 by the rotational power of the drive motor. The drive shaft 120 is installed to protrude forward of the lifting groove 111.

The three-contact switching unit 200 is configured to supply power to the load equipment from the power supply of normal power supply or to supply power to the load equipment from the power supply of emergency power supply, and configured so that normal power supply and emergency power supply may be switched in case of emergency. The three-contact switching unit 200 includes a panel 210 provided to be coupled to the casing 110 of the driving unit 100, a shaft 220, and a power terminal 230. The shaft 220 serves to input (ON) or open (OFF) the power terminal 230 while rotating by the power of the driving unit 100. The shaft 220 is composed of a normal power shaft 221 for inputting/opening normal power, and an emergency power shaft 222 for inputting/opening emergency power.

A linker 221a is installed at the end of the normal power shaft 221 so that the normal power shaft 221 of the three-contact switching unit 200 may be rotated in association with the movement of the driving shaft 120. This linker 221a is referred to as a first linker 221a for convenience. The first linker 221a extends from the end of the normal power shaft 221 toward the emergency power shaft 222, and a long hole 221b for movement of the driving shaft in the longitudinal direction of the first linker 221a is formed therein. The cross section of the normal power shaft 221 is formed in a polygonal shape, more preferably a square shape. A linker 222a is installed at the end of the emergency power shaft 222 so that the emergency power shaft 222 may be rotated in association with the movement of the drive shaft 120. This linker 222a is referred to as a second linker 222a for convenience. The second linker 222a extends from the end of the emergency power shaft 222 toward the normal power shaft 221. The first linker 221a and the second linker 222a of this configuration overlap each other in a "V" shape, as can be seen from FIGS. 2 and 3A. At this time, a "V" angle between one side and the other side of the lifting groove 111 is famed smaller than the "V" angle by the first linker 221a and the second linker 222a as shown in FIG. 3B. Meanwhile, a long hole 222b for movement of the driving shaft 120 in the longitudinal direction of the second linker 222a is also formed in the second linker 222a. The cross section of the emergency power shaft 222 is formed in a circular shape. The reason that the cross section of the emergency power shaft 222 is made in a circular shape is to prevent the emergency power shaft 222 from interlocking with the action of the N-phase overlapping unit 300 during the overlapping action of the N-phase overlapping unit 300, and a detailed description will be given later.

The power terminal 230 of the three-contact switching unit 200 is interlocked with the rotation of the shaft 220 to input/open normal power or input/open emergency power. The power terminal 230 is provided as a normal power terminal 231 and an emergency power terminal 232. The normal power terminal 231 is provided to be linked by the rotation of the normal power shaft 221, and for this purpose, an interlocking linker 240 is installed between the normal power terminal 231 and the normal power shaft 221. The interlocking linker 240 is provided as a linker in which a double hinge is coupled to have a joint, as shown in FIG. 2. The emergency power terminal 232 is provided to be linked by the rotation of the emergency power shaft 222, and for this purpose, an interlocking linker 240 is also installed between the emergency power terminal 232 and the emergency power shaft 222. Meanwhile, the interlocking linker 240 is referred to as a three-contact interlocking linker 240 for convenience of description. The three-contact interlocking linker 240 is composed of an upper linker 241 and a lower linker 242, and the length of the upper linker 241 is longer than the length of the lower linker 242.

The N-phase overlapping unit 300 enables switching to be made after the normal power and the emergency power overlap in N phase in the process of switching between normal power and emergency power in the three-contact switching unit 200, so that no potential difference is created and thus damage to electrical equipment may be prevented. The N-phase overlapping unit 300 includes a panel 310 provided to be coupled to the three-contact switching unit 200, an insertion part 320, a contact terminal 330, and a connection bar 340.

The insertion part 320 of the N-phase overlapping unit 300 is a configuration in which the shaft 220 of the three-contact switching unit 200 is coupled, and includes a first insertion part 321 to which the normal power shaft 221 is coupled, and a second insertion part 322 to which the emergency power shaft 222 is coupled. The first insertion part 321 forms an insertion hole 321a through which the normal power shaft 221 passes, and this insertion hole 321a is referred to as a first insertion hole 321a for convenience of description. The cross section of the first insertion hole 321a is formed in the same square shape as the cross section of the normal power shaft 221. With such a configuration, it is understandable that the first insertion part 321 may be interlocked with the normal power shaft 221 by rotation of the normal power shaft 221. The second insertion part 322 foams an insertion hole 322a through which the emergency power shaft 222 passes, and this insertion hole 322a is referred to as a second insertion hole 322a for convenience of description. Like the first insertion hole 321a, the second insertion hole 322a has a square-shaped cross section. At this time, the width of the second insertion hole 322a is formed larger than the outer diameter of the emergency power shaft 222. With such a configuration, due to the difference in diameter as well as the shape difference between the second insertion part 322 and the emergency power shaft 222, the second insertion part 322 and the emergency power shaft 222 do not interlock with each other. That is, unlike the normal power shaft 221 and the first insertion part 321 that are interlocked with each other, the emergency power shaft 222 and the second insertion part 322 are not interlocked.

The contact terminal 330 of the N-phase overlapping unit 300 is composed of an N-phase normal contact terminal 331 that is interlocked by the rotation of the first insertion part 321 to input/open the normal power side, and an N-phase emergency contact terminal 332 that is interlocked by the rotation of the second insertion part 322 to input/open the emergency power side. At this time, an interlocking linker 350 is installed between the first insertion part 321 and the N-phase normal contact terminal 331 and between the second insertion part 322 and the N-phase emergency contact terminal 332, respectively, so that the inputting/opening action of the contact terminal 330 may be made by the rotation of the first insertion part 321 and the second insertion part 322. This interlocking linker 350 is referred to as an N-phase interlocking linker 350 for convenience of description. The N-phase interlocking linker 350 is also composed of an upper linker 351 and a lower linker 352, and the length of the lower linker 352 is longer than the length of the upper linker 351. At this time, the upper linker 351 of the N-phase interlocking linker 350 is formed shorter than the upper linker 241 of the three-contact interlocking linker 240, and the lower linker 352 of the N-phase interlocking linker 350 is formed longer than the lower linker 242 of the three-contact interlocking linker 240. Due to this configuration of the interlocking linkers 240 and 350, the rotation radius of the three-contact interlocking linker 240 and the rotation radius of the N-phase interlocking linker 350 according to the rotation angle of the shaft 220 are different. That is, the rotation radius of the three-contact interlocking linker 240 for inputting/opening the power terminal 230 is smaller than the rotation radius of the N-phase interlocking linker 350 for inputting/opening the contact terminal 330.

The connection bar 340 of the N-phase overlapping unit 300 serves to interlock the first insertion part 321 and the second insertion part 322 with each other, and is connected between the first insertion part 321 and the second insertion part 322. That is, the connection bar 340 is provided to rotate the second insertion part 322 while pushing or pulling the second insertion part 322 by the rotation of the first insertion part 321. At this time, as described above, since the second insertion part 322 is provided to be rotated independently from the emergency power shaft 222, even if the connection bar 340 rotates the second insertion part 322, the emergency power shaft 222 is not rotated together along the second insertion part 322.

Hereinafter, the switching action and the overlapping action of the automatic transfer switch having the above configuration will be described with reference to FIGS. 3A to 5C.

Figure 3A:
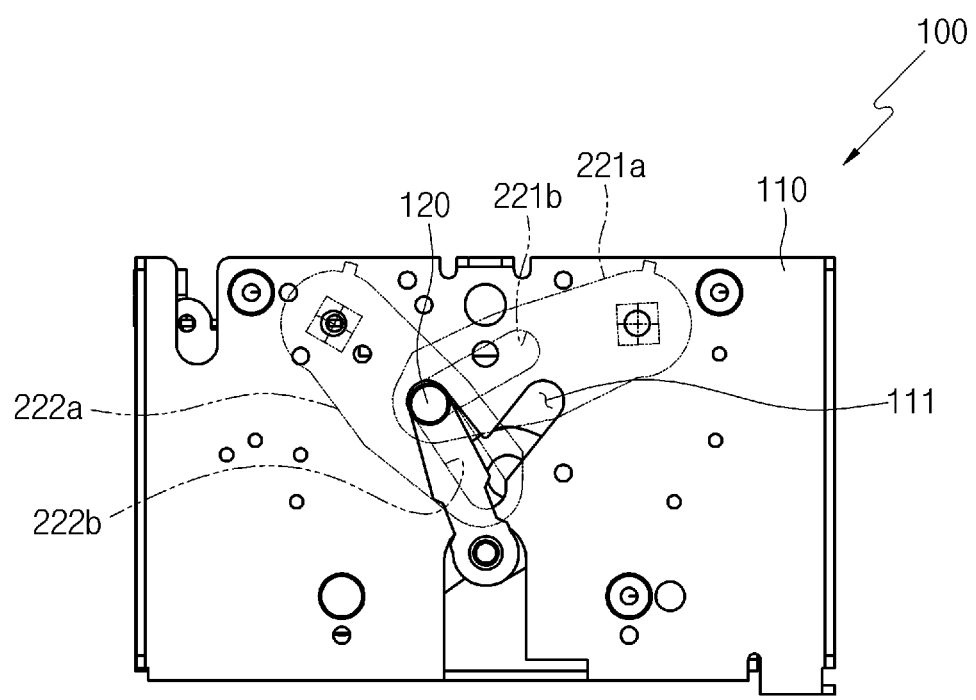
FIG. 3A to 3C are front views of a driving unit of the automatic transfer switch with an N-phase overlapping structure according to the preferred embodiment of the present disclosure, showing the operation of the driving unit in the process of switching from normal power supply to emergency power supply.
Figure 3B:
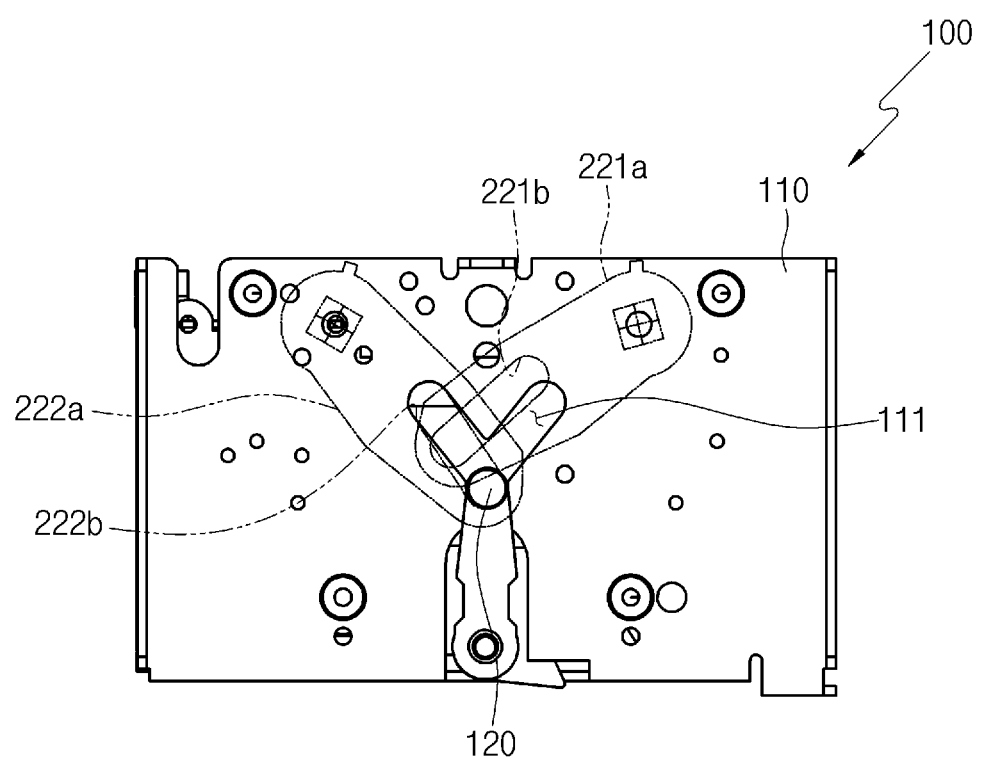
Figure 4A:
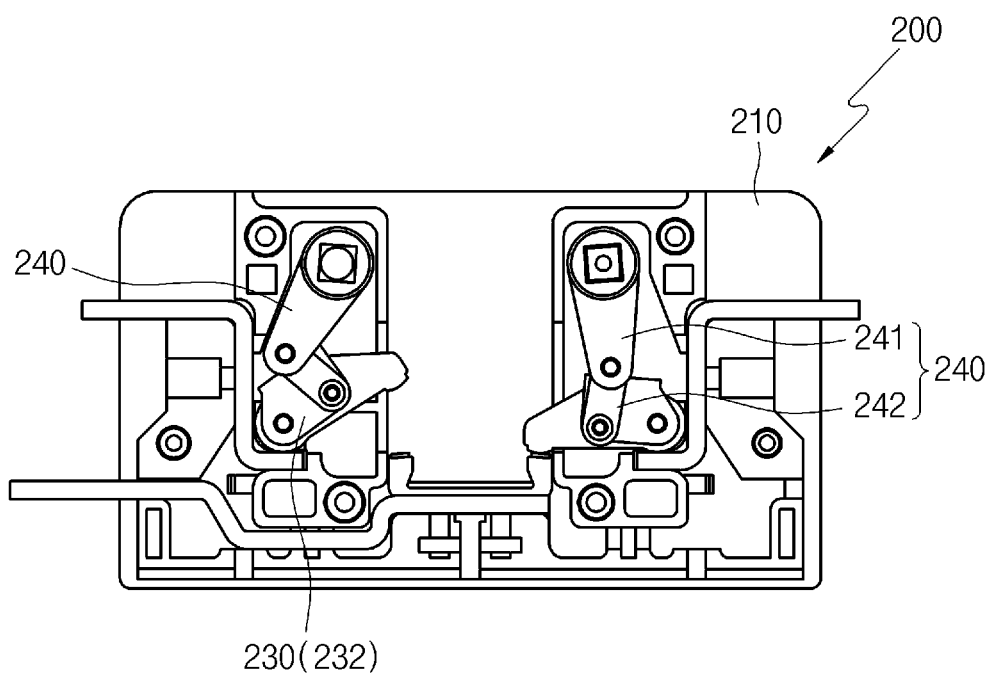
FIG. 4A to 4C are front views of a three-contact switching unit of the automatic transfer switch with an N-phase overlapping structure according to the preferred embodiment of the present disclosure, showing the three-contact switching action in the process of switching from normal power supply to emergency power supply.
Figure 5A:
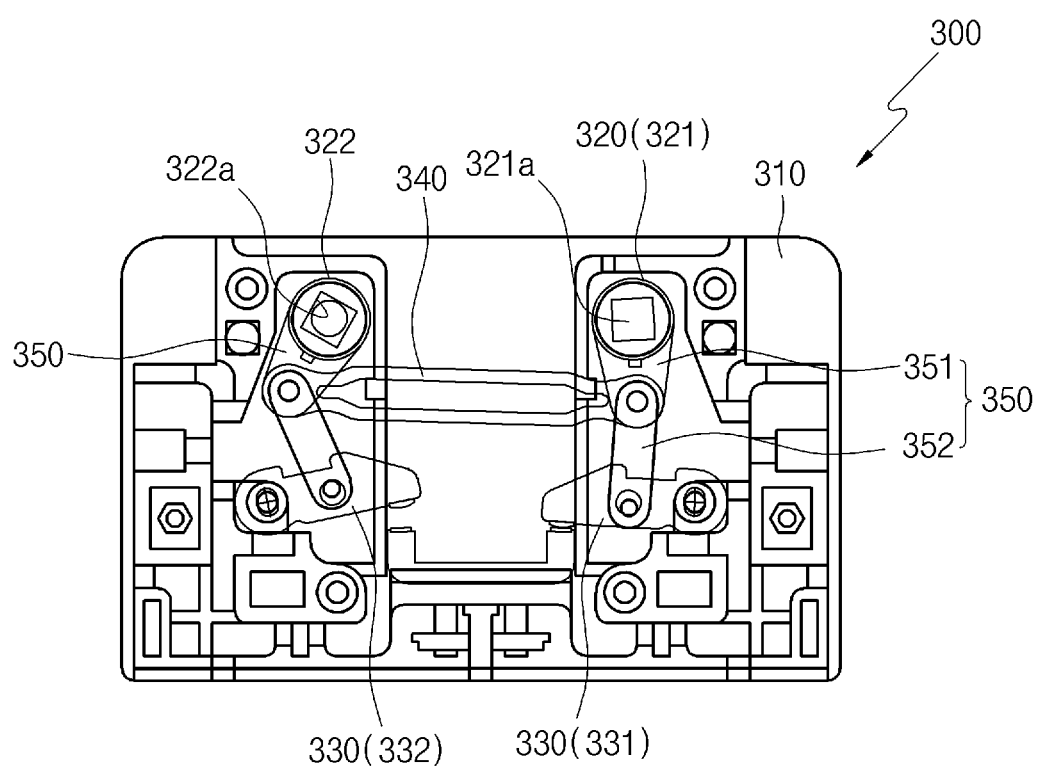
FIG. 5A to 5C are front views of an N-phase overlapping unit of the automatic transfer switch with an N-phase overlapping structure according to the preferred embodiment of the present disclosure, showing the N-phase overlapping action in the process of switching from normal power supply to emergency power supply.

FIGS. 3A, 4A, and 5A are front views showing the driving unit 100, the three-contact switching unit 200, and the N-phase overlapping unit 300 in a state in which normal power is input (ON), and in a normal state in which power is supplied from a normal power supply. In the drawings, the drive shaft 120 is located at the highest point on the left of the lifting groove 111, and a state in which only the normal power terminal 231 and the N-phase normal contact terminal 331 are put in is shown. Meanwhile, in such a state, if a problem occurs due to the interruption of power supply from normal power supply, the switching from normal power supply to emergency power supply is performed.

Figure 4B:
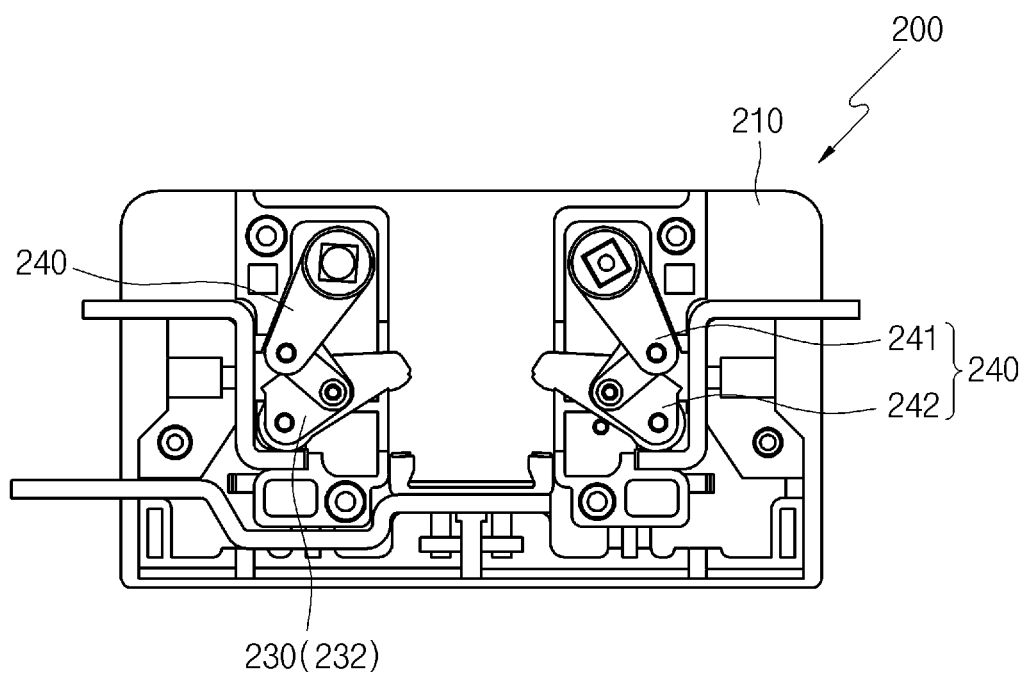
Figure 5B:
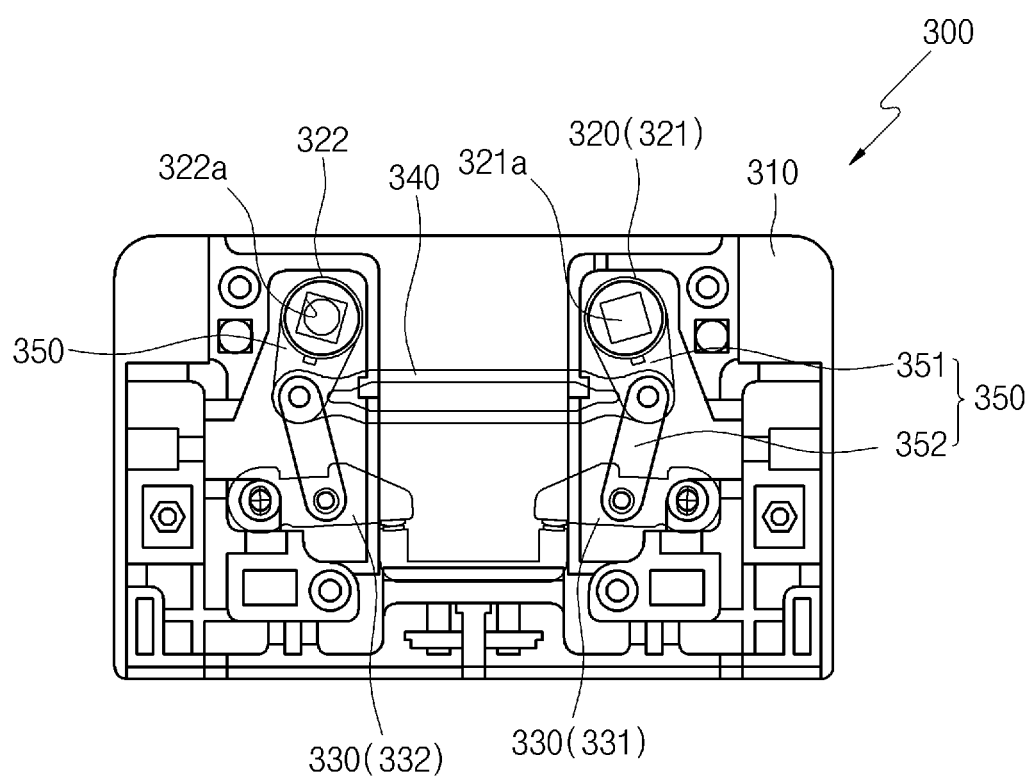

As shown in FIGS. 3A and 3B, the drive shaft 120 is lowered to the lowest point of the lifting groove 111 by the power of the drive motor. At this time, the drive shaft 120 located at the highest point of the long hole 222b of the second linker 222a moves to the lowest point of the long hole 222b of the second linker 222a along the long hole 222b of the second linker 222a, and the first linker 221a hung on the drive shaft 120 is rotated counterclockwise in the drawing by the movement of the drive shaft 120. The normal power shaft 221 also rotates in the rotational direction of the first linker 221a by the rotation of the first linker 221a. At this time, as shown in FIGS. 4A and 4B, the normal power terminal 231 is opened as the three-contact interlocking linker 240 is interlocked by the rotation of the normal power shaft 221. To be precise, the movable terminal of the normal power terminal 231 is separated from the fixed terminal and the contact is opened. In addition, as shown in FIGS. 5A and 5B, the normal power shaft 221 rotates the first insertion part 321 of the N-phase overlapping unit 300 while rotating. Here, it can be seen that even when the first insertion part 321 is rotated, the N-phase normal contact terminal 331 is not opened. This is because the rotation angle of the N-phase interlocking linker 350 is smaller than that of the three-contact interlocking linker 240 due to the structural characteristics of the N-phase interlocking linker 350.

Meanwhile, by rotation of the first insertion part 321, the connection bar 340 rotates while pulling the second insertion part 322 toward the first insertion part 321, and accordingly, the N-phase emergency terminal 332 is contacted while being rotated by the N-phase interlocking linker 350 to be in the input state (ON) as shown in FIG. 5B. At this time, even if the second insertion part 322 is rotated in association with the first insertion part 321 by the connection bar 340, the second insertion part 322 is rotated independently of the emergency power shaft 222. Thus, while the second insertion part 322 rotates, the emergency power shaft 222 does not rotate together. That is, in the N-phase overlapping unit 300, the N-phase emergency contact terminal 332 is put in while the second insertion part 322 is rotated. However, in the three-contact switching unit 200, the emergency power terminal 232 is not input. Accordingly, during switching, even at the moment when both the normal power terminal 231 and the emergency power terminal 232 are opened in the three-contact switching unit 200 as shown in FIG. 4B, both the N-phase normal contact terminal 331 and the N-phase emergency contact terminal 332 are input in the N phase as shown in FIG. 5B, thus, no potential difference is created.

Figure 3C:
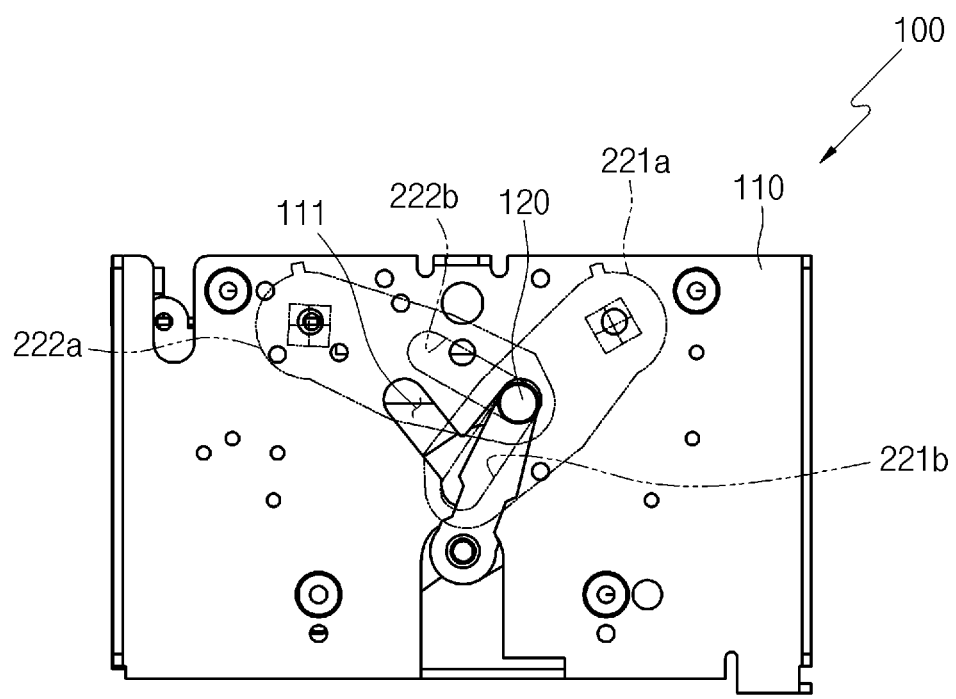
Figure 4C:
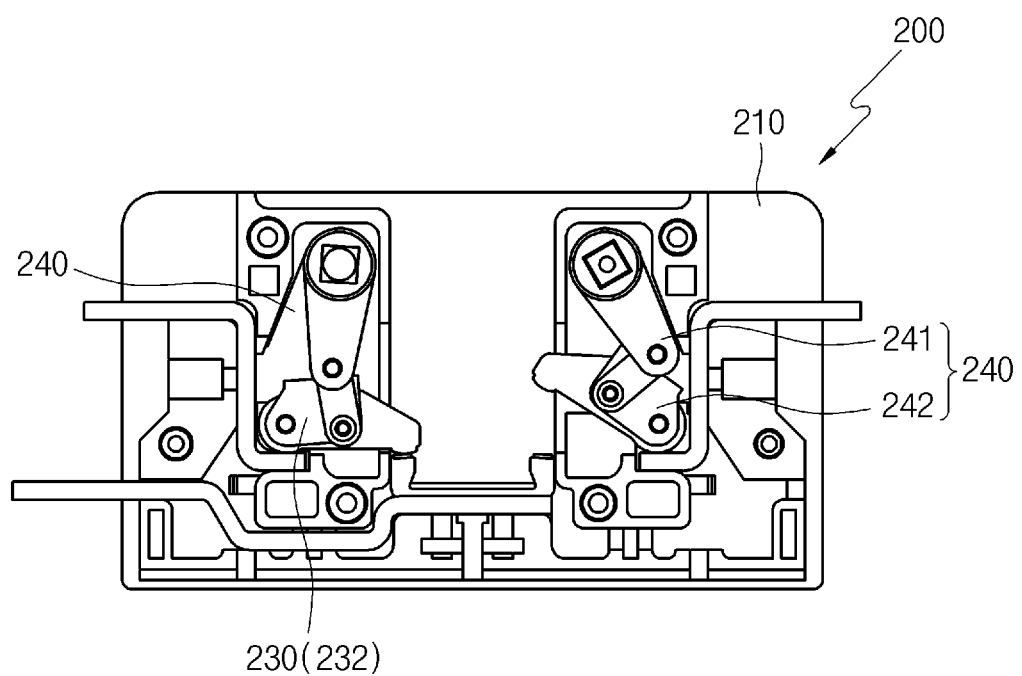
Figure 5C:
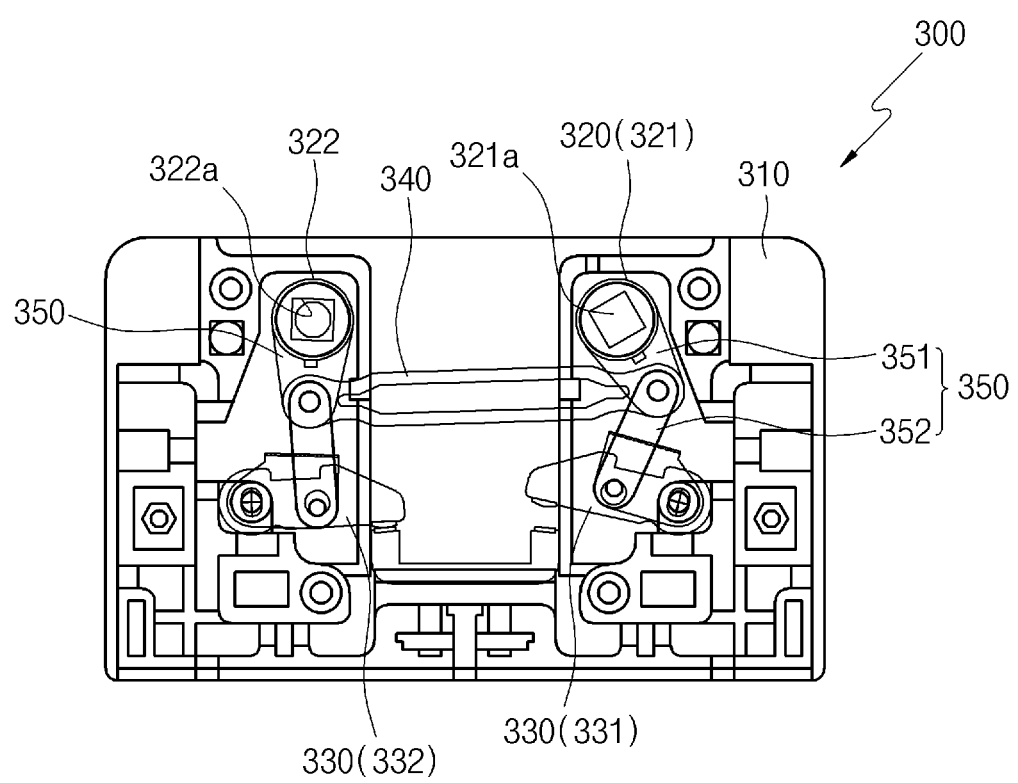

Thereafter, the drive shaft 120 located at the lowest point of the lifting groove 111 moves to the highest point of the lifting groove 111 on the other side by the power of the drive motor, as shown in FIGS. 3B and 3C. At this time, as shown in FIGS. 4B and 4C, the second linker 222a hung on the drive shaft 120 interlocks the emergency power shaft 222 while rotating counterclockwise in the drawing. Here, the emergency power terminal 232, which was opened by the rotation of the emergency power shaft 222, is input. That is, the movable terminal of the emergency power terminal 232 is in contact with the fixed terminal to turn on the emergency power. Meanwhile, the drive shaft 120 rotates the second linker 222a counterclockwise while moving to the highest point of the lifting groove 111, and also rotates the first linker 221a counterclockwise. Since the angle by one side and the other side of the lifting groove 111 is smaller than the angle by the overlapping first linker 221a and the second linker 222a, the first linker 221a may be rotated according to the position of the lifting groove 111 of the drive shaft 120. Accordingly, as the normal power shaft 221 further rotates the first insertion part 321 counterclockwise as shown in FIGS. 5b and 5c, the N-phase normal contact terminal 331 is opened by the N-phase interlocking linker 350. As a result, the N-phase overlapping switching process from normal power to emergency power is completed, and the process of switching from emergency power to normal power is performed in reverse order.

As previously described, the automatic transfer switch with an N-phase overlapping structure according to the present disclosure enables the normal and emergency power supplies to be switched after overlapping in the neutral contact (N phase) during switching between normal power and emergency power at the three-contact switching unit. Accordingly, the present disclosure prevents malfunction of electronic equipment or damage to electronic equipment due to the potential difference created in the process of switching between normal power and emergency power, thereby enabling stable operation of electronic equipment.

In the above, the present disclosure has been described in detail with respect to the described embodiments, however, it is obvious to those skilled in the art that various modifications and variations are possible within the scope of the technical spirit of the present disclosure, and it is natural that such variations and modifications belong to the appended claims.

What is claimed is:

1. An automatic transfer switch with an N-phase overlapping structure, the switch comprising:
a driving unit including a drive shaft provided to generate power;
a three-contact switching unit including a normal power shaft and an emergency power shaft provided to be rotated by the drive shaft, and a normal power terminal and an emergency power terminal for inputting/releasing normal power and emergency power by rotation of the normal power shaft and the emergency power shaft; and an N-phase overlapping unit including a first insertion part having a first insertion hole into which the normal power shaft is inserted, an N-phase normal contact terminal provided to input/release an N-phase normal power by rotation of the first insertion part, a second insertion part having a second insertion hole into which the emergency power shaft is inserted, an N-phase emergency contact terminal provided to input/release an N-phase emergency power by rotation of the second insertion part, and a connection bar connected between the first insertion part and the second insertion part so as to be interlocked with each other by rotation of the first insertion part and the second insertion part, wherein the first insertion part of the N-phase overlapping unit is provided to be interlocked with the rotation of the normal power shaft, and the second insertion part is provided so as to be rotated independently of the emergency power shaft.

2. The automatic transfer switch with an N-phase overlapping structure of claim 1, wherein a cross section of the second insertion hole of the second insertion part is polygon, and a cross section of the emergency power shaft is circular.

3. The automatic transfer switch with an N-phase overlapping structure of claim 1, wherein the drive shaft is provided to be able to lift from one side to the other side of the driving unit, and each of the normal power shaft and the emergency power shaft includes linkers each having a long hole through which the drive shaft is hooked and coupled.

4. The automatic transfer switch with an N-phase overlapping structure of claim 3, wherein a lifting groove is formed in the driving unit to provide a lifting path of the drive shaft in a "V" shape, and the linkers are overlapped with each other in a "V" shape corresponding to the lifting groove.

5. The automatic transfer switch with an N-phase overlapping structure of claim 4, wherein a "V" angle between the first side and the second side of the lifting groove is smaller than a "V" angle of the linkers overlapping each other in the "V" shape.

6. The automatic transfer switch with an N-phase overlapping structure of claim 2, wherein the drive shaft is provided to be able to lift from one side to the other side of the driving unit, and each of the normal power shaft and the emergency power shaft includes linkers each having a long hole through which the drive shaft is hooked and coupled.

7. The automatic transfer switch with an N-phase overlapping structure of claim 6, wherein a lifting groove is formed in the driving unit to provide a lifting path of the drive shaft in a "V" shape, and the linkers are overlapped with each other in a "V" shape corresponding to the lifting groove.

8. The automatic transfer switch with an N-phase overlapping structure of claim 7, wherein a "V" angle between the first side and the second side of the lifting groove is smaller than a "V" angle of the linkers overlapping each other in the "V" shape.

* * * * *